March 18, 1958    J. J. WHITE    2,826,961
ROCKET DISPENSERS
Filed April 15, 1953
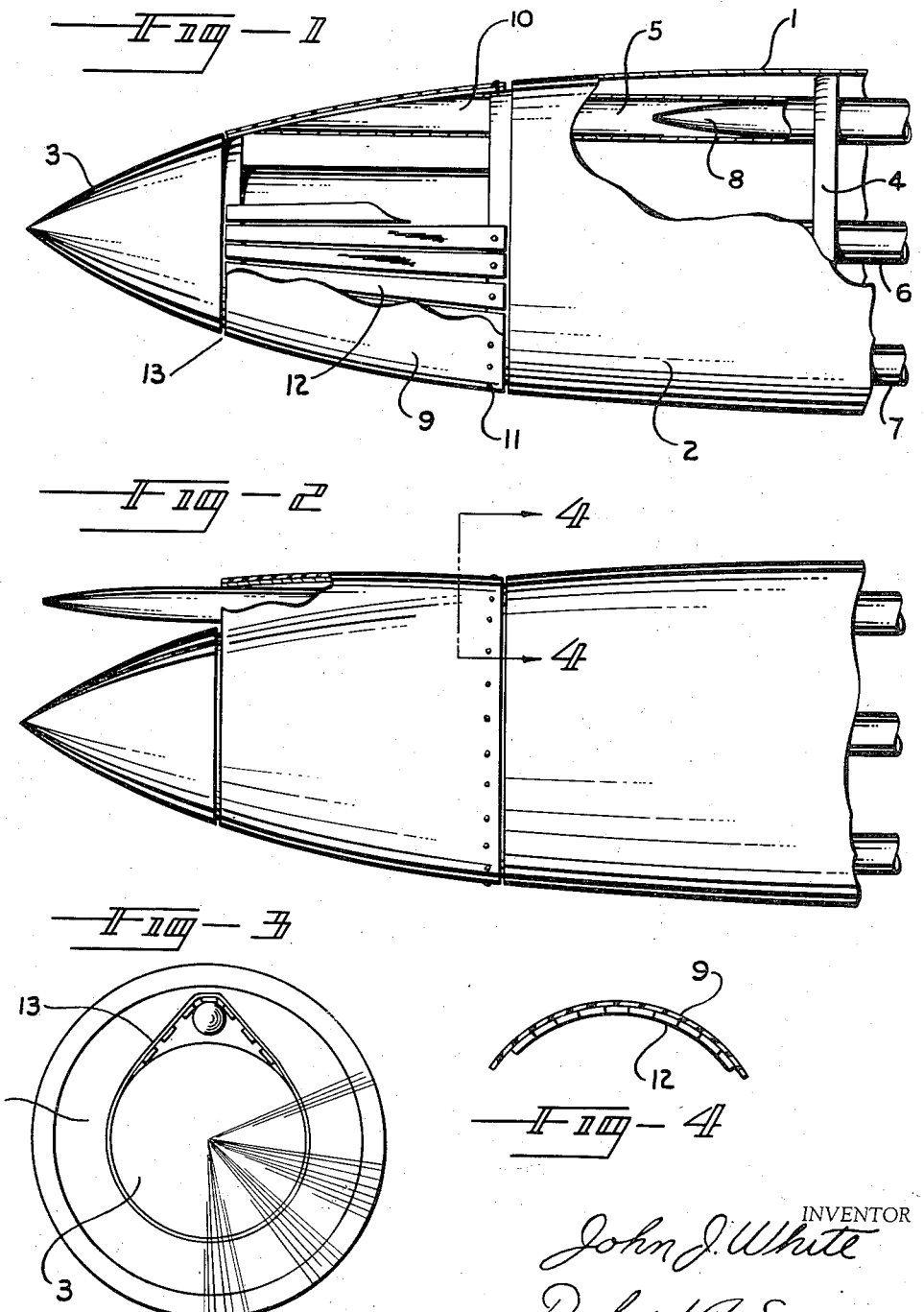
INVENTOR
John J. White
BY Richard A. Spencer &
John J. White
ATTORNEYS

United States Patent Office 2,826,961
Patented Mar. 18, 1958

2,826,961

ROCKET DISPENSERS

John J. White, Washington, D. C., assignor to ACF Industries, Incorporated, New York, N. Y., a corporation of New Jersey Application April 15, 1953, Serial No. 348,906

3 Claims. (Cl. 89—1.7)

The present invention relates in general to aircraft rocket packages or dispensers and more particularly to rocket packages or dispensers wherein the doors or apertures through which the rockets are fired are normally closed and are opened by the rockets as they are fired.

The foregoing and other features of the invention will be more fully described hereinafter and clarified by the accompanying drawings, in which Fig. 1 is an elevation, partially in section, of the forward section of a rocket package embodying one form of the invention.

Fig. 2 is an elevation, partially in section, of the rocket package of Fig. 4 showing a rocket being fired.

Fig. 3 is an end view looking aft of the package of Figs. 4 and 5 showing the rocket leaving the package.

Fig. 4 is a section taken on line 4—4 of Fig. 2.

Much experimental and development work has been done in recent years on various forms of rocket packages which might be attached to military aircraft. Various problems have been encountered in this work. Since such a device would be mounted externally on a high performance aircraft it is imperative that the least possible increase in aerodynamic drag should be created by the addition of the package. This requirement precludes the use of a package in which the muzzles of the rocket tubes are allowed to be uncovered either before or after the rockets have been fired. Various methods have been employed to open and close doors over the tube muzzles but these schemes have proven very complicated and not too reliable at best. Another approach to the problem is to provide a rocket package with a frangible streamlined nose section which would be shattered by the exit of the rockets. This method has the disadvantage of producing a large amount of aerodynamic drag after the nose portion has been blown off. This increased drag results in either slowing down the aircraft or forcing the pilot to jettison the remainder of the package.

The object of this invention is to provide a rocket package which is inexpensive to manufacture, need not be expendable and presents a streamlined configuration both before and after the rockets have been fired.

Referring to Fig. 1 of the drawings: 1 is a rocket package or dispenser which may be slung from the wing or fuselage of a military aircraft by means of suitable quick-disconnect fittings (not shown) when the mission of the aircraft dictates its use. 2 is the substantially cylindrically shaped body portion of the package which would be constructed of light weight sheet metal, molded reinforced plastic or the like. 3 is a streamlined nose piece. 4 is an internal bulkhead or former. 5, 6 and 7 are rocket tubes which are spaced radially about the longitudinal center line of the package and are rigidly affixed to the interior structure of the package. 8 is the nose of a rocket which is contained in tube 5. 9 is a molded rubber, or other flexible material, sheath which encloses the exit openings 10 of the rocket tubes in body portion 2. Sheath 9 is secured only at its rear edge 11 to the body portion 2 of the package by means of rivets, screws, cement or any other suitable means. Sheath 9 may be reinforced by metal stays 12 or other suitable means if necessary to prevent the air pressure from forcing sheath 9 locally into the rocket tube openings 10. Sheath 9 is so molded that it must be distended radially to be installed on the rocket package. This is done to insure a tight fit between the forward peripheral edge 13 of sheath 9 and nose piece 3 of the dispenser. If this were not a snug tension fit the air might balloon the sheath out and tear it off.

As can be seen in Figs. 2 and 3 the forward edge 13 is lifted and stretched by the nose 8 of the rocket when it is fired. After the rocket has completely emerged from the dispenser the sheath will snap back to conform to the streamlined contour of the dispenser.

To insure that the stretch required in sheath 9 is not localized in the neighborhood of the rocket being fired a suitable lubricant may be applied to the inner surface of sheath 9. This lubricant would allow the stretch necessary for rocket egress to be more evenly distributed over the periphery of the sheath.

While the drawings show only one ring of rocket tubes in the package it is obvious that an additional ring of tubes could be arranged concentrically within the outer ring of tubes and an additional flexible sheath could be provided to cover the openings of the inner ring of tubes. While the package or dispenser has been shown and described as having a circular cross section the invention is equally applicable to a dispenser having other type cross sections such as rectangular or elliptical.

I do not limit myself to the precise apparatus shown and described above as this is to be considered merely as a representative form of my invention.

What I claim is:

1. A rocket dispenser adapted to be transported by a vehicle at high velocity, said dispenser including an inner bulkhead structure and an outer shell of ogival form supported thereabout, said shell including a conical nose piece fixed at the forward extremity of the bulkhead structure and a tubular body portion mounted about the bulkhead structure and positioned rearwardly of and spaced from the conical nose piece to provide an exit opening for the passage of rockets therebetween, a plurality of rocket dispensing tubes housed within said shell rearward of said exit opening, said dispensing tubes having their longitudinal axes parallel to the axis of said dispenser and their forward ends positioned for discharging of the rockets therefrom within the area between the spaced nose piece and said tubular portion, and a resilient truncated conical sheath having resilient forwardly extending metallic reinforcing elements, said truncated sheath embracing the bulkhead structure between the nose piece and said tubular portion and forming a connection therebetween to complete the ogival outer structure, said conical sheath having its rear end portion secured to the bulkhead, whereby its forward end is capable of radial expansion to permit passage of a rocket.

2. The structure of claim 1 characterized in that the rocket dispensing tubes are arranged concentrically within and adjacent to the tubular body portion.

3. The structure of claim 1 characterized in that the sheath when installed in position is tensioned against radial movement.

References Cited in the file of this patent

UNITED STATES PATENTS

| 44,631 | Hull | Oct. 11, 1864 |
|---|---|---|
| 45,020 | Clew | Nov. 15, 1864 |
| 587,731 | Hammer | Aug. 10, 1897 |
| 2,395,435 | Thompson et al. | Feb. 26, 1946 |
| 2,609,730 | Bergstrom | Sept. 9, 1952 |

FOREIGN PATENTS

| 171,502 | Germany | June 5, 1906 |
|---|---|---|
| 924,013 | France | Mar. 3, 1947 |